(12) United States Patent
Mainini et al.

(10) Patent No.: US 8,069,823 B2
(45) Date of Patent: Dec. 6, 2011

(54) VIBRATION STIMULUS DELIVERY DEVICE

(75) Inventors: Christopher E. Mainini, Knoxville, TN (US); Keith Griffith, Oneida, TN (US)

(73) Assignee: Radio Systems Corporation, Knoxville, TN (US)

( * ) Notice: Subject to any disclaimer, the term of this patent is extended or adjusted under 35 U.S.C. 154(b) by 873 days.

(21) Appl. No.: 12/017,079

(22) Filed: Jan. 21, 2008

(65) Prior Publication Data

US 2008/0156278 A1   Jul. 3, 2008

Related U.S. Application Data

(63) Continuation-in-part of application No. 11/619,452, filed on Jan. 3, 2007.

(51) Int. Cl.
 *A01K 15/00* (2006.01)
(52) U.S. Cl. ........................ 119/718; 119/719
(58) Field of Classification Search .................. 119/856, 119/718–720
See application file for complete search history.

(56) References Cited

U.S. PATENT DOCUMENTS

| | | | | |
|---|---|---|---|---|
| 2,512,621 A * | 6/1950 | Emerson | ................. | 601/58 |
| 3,364,922 A * | 1/1968 | Teranishi | ................. | 601/72 |
| 3,468,304 A * | 9/1969 | Teranishi | ................. | 601/72 |
| 3,623,481 A * | 11/1971 | Curran | ................. | 601/74 |
| 3,735,757 A * | 5/1973 | MacFarland | ................. | 601/72 |
| 3,763,853 A * | 10/1973 | Jochimski | ................. | 601/70 |
| 4,180,013 A | 12/1979 | Smith | | |
| 4,846,158 A * | 7/1989 | Teranishi | ................. | 601/72 |
| 5,030,196 A * | 7/1991 | Inoue | ................. | 600/14 |
| 5,067,441 A | 11/1991 | Weinstein | | |
| 5,769,032 A | 6/1998 | Yarnall, Sr. et al. | | |
| 6,028,531 A * | 2/2000 | Wanderlich | ................. | 340/7.6 |
| 6,047,664 A | 4/2000 | Lyerly | | |
| 6,196,990 B1 * | 3/2001 | Zicherman | ................. | 604/29 |
| 6,807,720 B2 | 10/2004 | Brune et al. | | |
| 6,907,883 B2 * | 6/2005 | Lin | ................. | 128/844 |
| 6,928,958 B2 | 8/2005 | Crist et al. | | |
| 7,434,541 B2 * | 10/2008 | Kates | ................. | 119/720 |
| 7,518,275 B2 * | 4/2009 | Suzuki et al. | ................. | 310/81 |
| 2003/0116099 A1 | 6/2003 | Kim et al. | | |
| 2005/0059909 A1 | 3/2005 | Burgess | | |
| 2006/0196445 A1 | 9/2006 | Kates | | |
| 2008/0119767 A1 * | 5/2008 | Berry et al. | ................. | 601/46 |
| 2009/0012355 A1 * | 1/2009 | Lin | ................. | 600/41 |
| 2009/0082830 A1 * | 3/2009 | Folkerts et al. | ................. | 607/48 |

\* cited by examiner

*Primary Examiner* — Kimberly Smith
(74) *Attorney, Agent, or Firm* — Pitts, Lake & Bells, PC

(57) ABSTRACT

Described is a vibration stimulus delivery device for delivering a vibration stimulus to an animal and for maximizing the robustness and intensity of the vibration stimulus. The vibration stimulus delivery device is carried by the animal and includes a housing and a vibration probe. The vibration probe is positioned in direct contact with the skin of the animal and generates a vibration, which, when delivered to the animal, is the vibration stimulus. The vibration probe is coupled to the housing such that the coupling minimizes the inherent vibration dampening effect caused by the weight and mass of the housing. The result is a vibration stimulus delivery device that delivers a more robust and intense vibration stimulus to the animal.

14 Claims, 5 Drawing Sheets

VIBRATION STIMULUS DELIVERY DEVICE

CROSS-REFERENCE TO RELATED APPLICATIONS

This is a continuation-in-part of application Ser. No. 11/619,452, filed Jan. 3, 2007.

STATEMENT REGARDING FEDERALLY SPONSORED RESEARCH OR DEVELOPMENT

Not Applicable

BACKGROUND OF THE INVENTION

1. Field of the Invention

This invention pertains to a device for delivering a vibration stimulus to an animal. More particularly, this invention pertains to a device for maximizing the robustness and intensity of the vibration stimulus.

2. Description of the Related Art

Many animal training systems include a device for delivering a vibration stimulus to an animal. Studies have revealed that animals respond to a vibration stimulus used either as a primary deterrent or as a warning stimulus that is followed by a more intense deterrent, such as an electrical stimulus. Whether a vibration stimulus is effective as a deterrent or merely a warning stimulus depends on factors such as the breed, personality, sensitivity, and coat type of the animal. Additionally, a vibration stimulus may be effectively used as the primary deterrent of an animal training system for a period of time, but cease to be effective when the animal overcomes the initial startling effect of the vibration stimulus and discovers that the vibration stimulus does not trigger the animal's sensation of pain. This process is known as habituation. When the animal becomes accustomed to a vibration stimulus by way of habituation or the animal does not respond to a vibration stimulus as a primary deterrent, a more intense stimulus, such as an electrical stimulus, must be used to discourage the animal's undesirable behavior.

When a vibration stimulus can be used in the stead of a more intense stimulus, such as an electrical stimulus, it is desired. The preference for a vibration stimulus is because many pet owners view more intense stimuli, such as an electrical stimulus, as harmful or inhumane to the animal. Consequently, pet owners prefer a vibration stimulus over an electrical stimulus. Additionally, particular animals are hypersensitive to the extent that an intense stimulus, such as an electrical stimulus, would unnecessarily distress the animal both physically and psychologically. However, conventional vibration stimulus delivery devices have been unable to provide a vibration stimulus effective enough to replace a more intense stimulus, such as an electrical stimulus, in accordance with the reasons discussed above. Conventional vibration stimulus delivery devices include a vibration source disposed within a housing. The housing is typically a box-type structure that is mounted at the outside face of a pet collar. These conventional devices are designed to generate a vibration in response to an undesirable behavior exhibited by the animal. However, these devices are limited in that the generated vibration is not focused toward to the animal. Instead, a significant portion of the generated vibration is lost because the housing is not secured against the animal, but is vibrating freely at the outside face of the pet collar. Additionally, conventional devices are limited in that the generated vibration must be transferred from the housing, through the pet collar, through the animal's fur, and to the animal's skin. Consequently, the generated vibration is dampened by the housing, the pet collar, and the animal's fur, reducing the effectiveness of the vibration stimulus.

Other conventional vibration stimulus delivery devices include a vibration probe that is rigidly secured to the housing and that includes a vibrator such that the source of the generated vibration is within the probe and not the housing. Although the vibration generated by these conventional devices is not transferred from the housing and through the pet collar, the devices are limited in that the weight and the mass of the housing dampen the vibration, reducing the effectiveness of the vibration stimulus. Consequently, a vibration stimulus delivery device that delivers a vibration not dampened by the housing is desired.

BRIEF SUMMARY OF THE INVENTION

In accordance with the various features of the present invention there is provided a vibration stimulus delivery device for delivering a vibration stimulus to an animal and for maximizing the robustness and intensity of the vibration stimulus. The vibration stimulus delivery device includes a housing, a vibration probe, and a coupler. The housing is adapted to be carried by the animal, such as by way of an animal collar. The vibration probe is secured to the housing the coupler such that the vibration probe is positioned in direct physical contact with the animal's skin when the vibration stimulus delivery device is carried by the animal. The vibration probe generates the vibration stimulus. The coupler provides the vibration probe with a range of movement within which the vibration probe vibrates substantially freely with respect to the housing. Because the vibration probe is positioned in direct contact with the skin of the animal, the vibration probe delivers the vibration stimulus to the animal. Additionally, because the coupler provides the vibration probe with the range of motion, the vibration stimulus delivery device minimizes the inherent vibration dampening effect caused by the weight and mass of the housing and maximizes the robustness and intensity of the delivered vibration stimulus.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
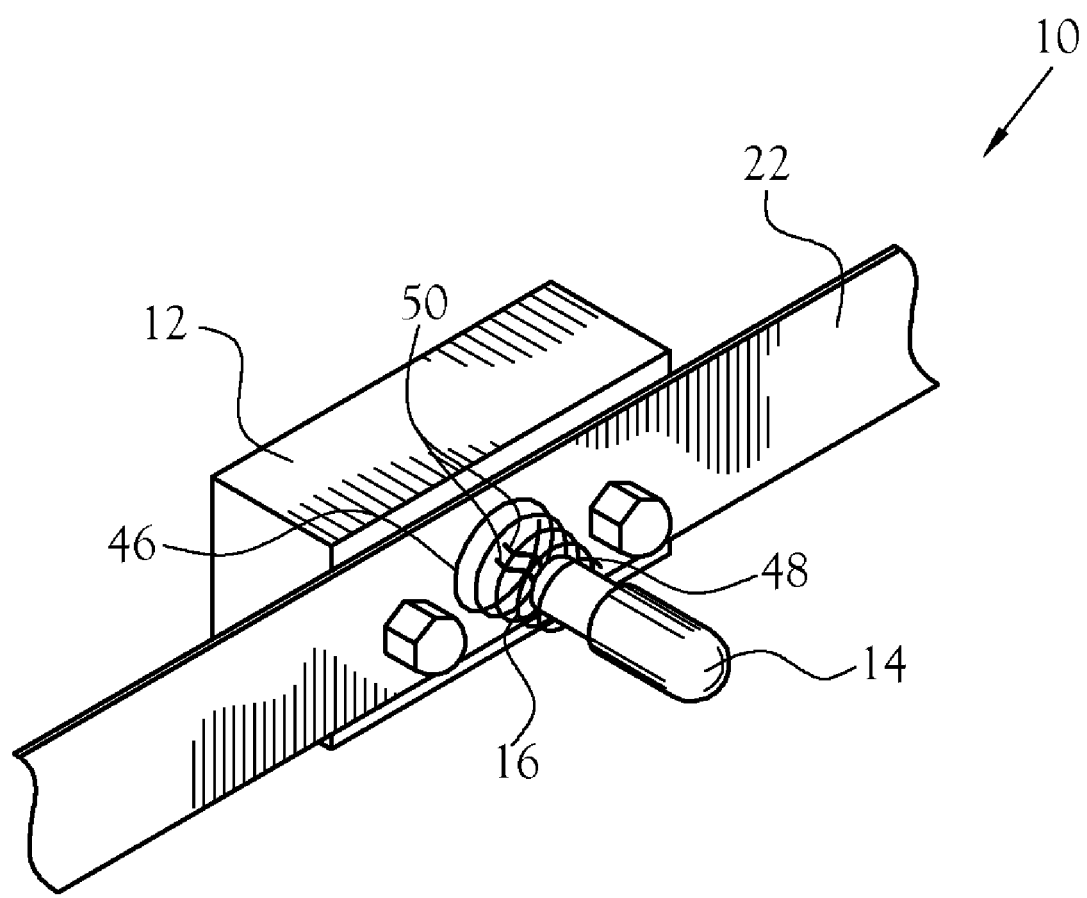
FIG. 1 illustrates one embodiment of the vibration stimulus delivery device in accordance with the various features of the present invention.

The present invention provides a vibration stimulus delivery device for delivering a vibration stimulus to an animal and for maximizing the robustness and intensity of the vibration stimulus. The vibration stimulus delivery device is carried by the animal and includes a housing and a vibration probe. The vibration probe is positioned in direct contact with the skin of the animal and generates a vibration, which, when delivered to the animal, is the vibration stimulus. The vibration probe is coupled to the housing such that the coupling minimizes the inherent vibration dampening effect caused by the weight and mass of the housing. The result is a vibration stimulus delivery device that delivers a more robust and intense vibration stimulus to the animal. One embodiment of the vibration stimulus delivery device constructed in accordance with the various features of the present invention is illustrated generally at 10 in FIG. 1.

The vibration stimulus delivery device 10 includes a housing 12, a vibration probe 14, and a coupler 16. The vibration probe 14 is secured to the housing 12 using the coupler 16. The vibration stimulus delivery device 10 is carried by an animal. In the illustrated embodiment, the vibration stimulus delivery device 10 is secured to an animal collar 22, which is adapted to be worn by the animal, such that the vibration stimulus delivery device 10 is carried by the animal. The vibration probe 14 is secured to the housing 12 such that the vibration probe 14 is positioned in direct physical contact with the animal's skin. The vibration probe 14 is positioned in direct physical contact with the animal's skin when the vibration probe 14 penetrates the animal's fur and physically engages the animal's skin, such as illustrated in FIG. 2, where the animal's skin is represented at 18 and the animal's fur is represented at 20. In the illustrated embodiment of FIG. 1, the housing 12 is secured to outside face of the animal collar 22 using fasteners that pass through respective openings in the animal collar 22. The coupling 16 passes through an opening in the animal collar 22 such that the vibration probe 14 is disposed opposite the housing 12 with respect to the animal collar 22. As a result, when the animal collar 22 is worn by the animal, the vibration probe 14 is positioned in direct contact with the animal's skin. It should be noted that the vibration probe 14 can be carried by the animal using a device other than the animal collar 22, such as an animal harness, without departing from the scope or spirit of the present invention.

Figure 3:
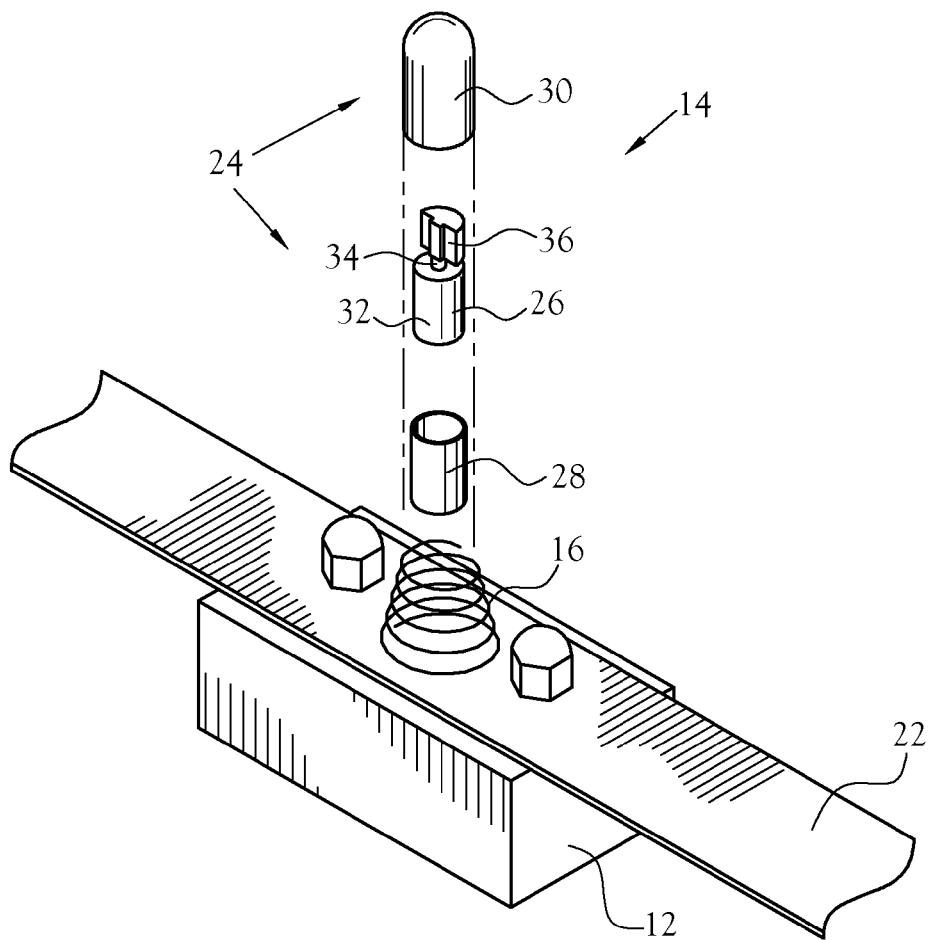
FIG. 3 is an exploded view of one embodiment of the vibration probe of the vibration stimulus delivery device.

FIG. 3 is an exploded view of one embodiment of the vibration probe 14 in accordance with the various features of the present invention. The vibration probe 14 includes a vibration probe housing 24 and a vibrator 26. The vibration probe housing 24 houses the vibrator 26. In the illustrated embodiment, the vibration probe housing 24 includes a base member 28 and a tip member 30. The base member 28 receives the vibrator 26 such that the vibrator 26 is substantially disposed within the base member 28. The base member 28 cooperates with the tip member 30 such that vibration probe housing 24 substantially encloses the vibrator 26. The tip member 30 is the portion of the vibration probe 14 that is positioned in direct contact with the animal's skin. The tip member 30 is constructed of a material that does not significantly dampen the vibration generated by the vibrator 26. For example, in one embodiment, the tip member 30 is constructed of a moderately rigid rubber. Those skilled in the art will recognize that the tip member 30 can be constructed of a material other than a rubber, such as a plastic, without departing from the scope or spirit of the present invention. The vibration probe housing 24 protects the vibrator 26 from elements such as pet fur and environmental debris. It should be noted that various embodiments of the vibration probe housing 24 are achievable without departing from the scope or spirit of the present invention.

The vibrator 26 generates a vibration to the extent that the vibration probe housing 24, and consequently the vibration probe 14, vibrates. In the illustrated embodiment, the vibrator 26 includes a motor 32, a shaft 34, and a mass 36. The motor 32 is mechanically engaged with a first end of the shaft 34 such that the motor 32 rotates the shaft 34 about its longitudinal axis. The mass 36 is eccentrically secured to a second end of the shaft 34, which is opposite the first end of the shaft 34. Because the mass 36 is eccentrically secured to the shaft 34, a vibration is generated when the motor 32 rotates the shaft 34. It should be noted that the vibrator 26 can be constructed of components other than the motor 32, the shaft 34, and the mass 36 without departing from the scope or spirit of the present invention.

Figure 4:
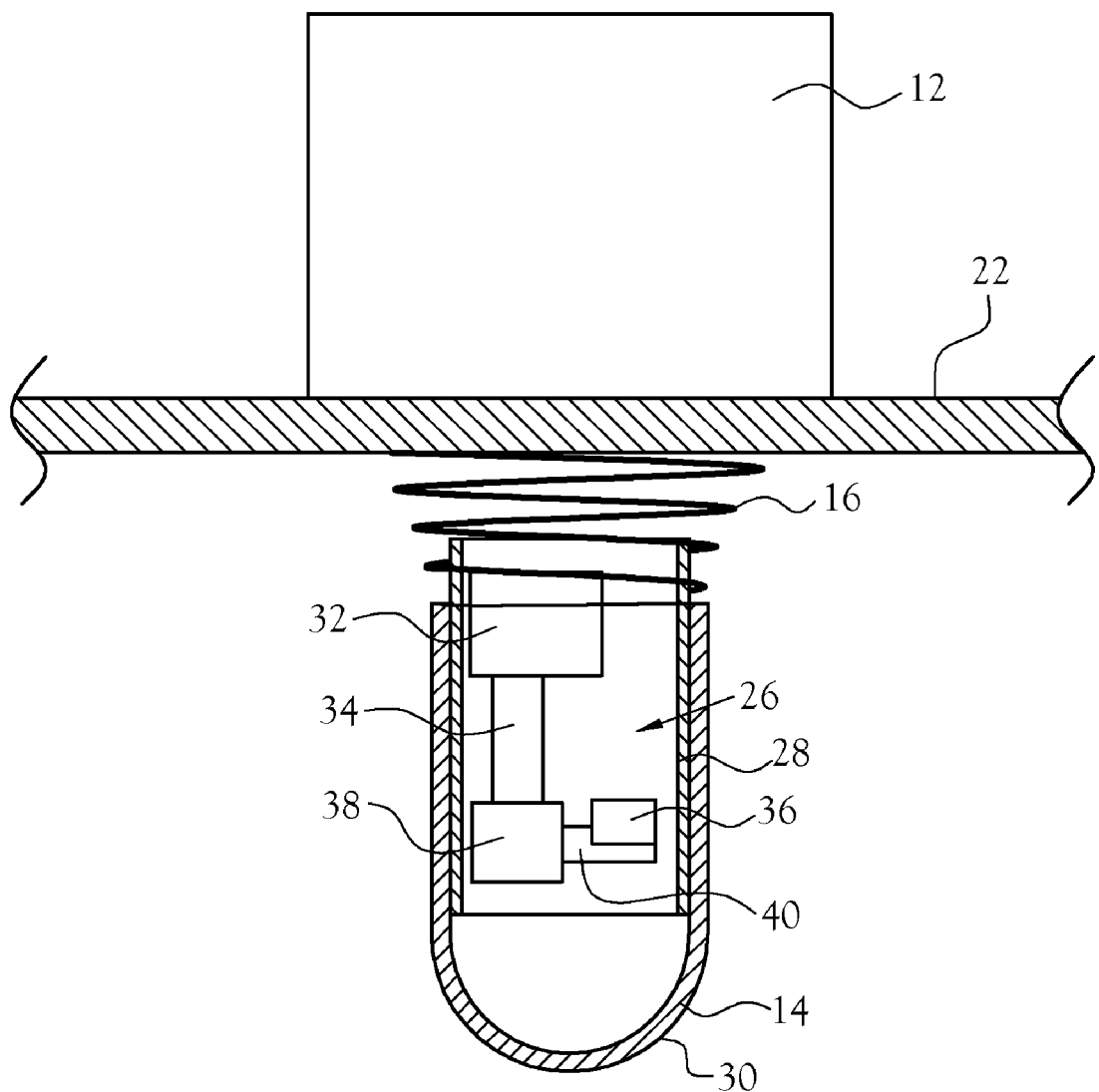
FIG. 4 illustrates an alternate embodiment of the vibration probe.
Figure 5:
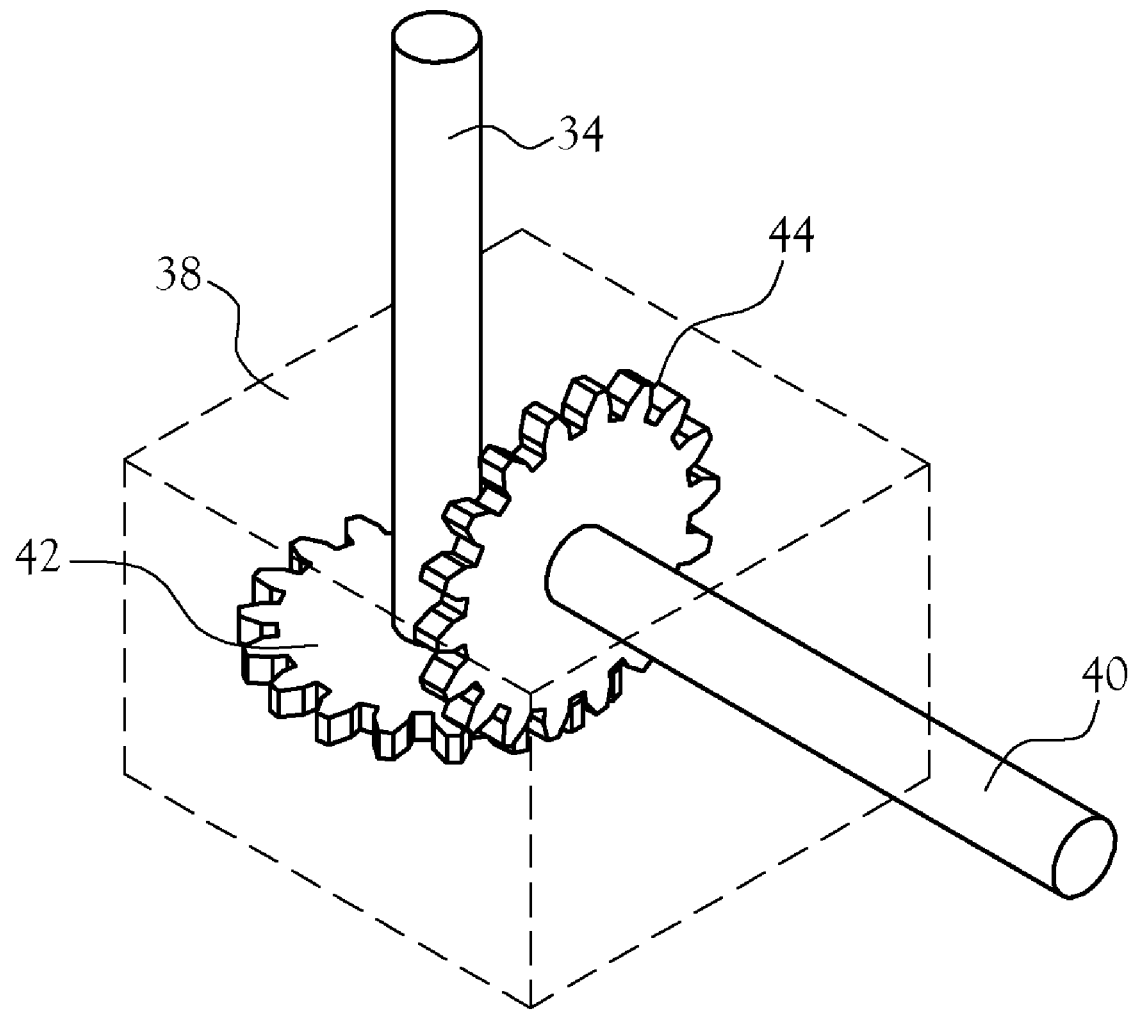
FIG. 5 illustrates a gearbox of the vibration probe of FIG. 4.

FIG. 4 illustrates an alternate embodiment of the vibrator 26. In the alternate embodiment, the vibrator 26 includes a gearbox 38 disposed within the base member 28. The shaft 34, which is mechanically engaged with the motor 32 in accordance with above-discussion, is mechanically engaged with the gearbox 38. The gearbox 38 is mechanically engaged with a secondary shaft 40 such that the secondary shaft 40 is positioned perpendicular to the shaft 34. In accordance with above-discussed embodiments, the mass 36 is eccentrically secured to the secondary shaft 40. When the motor 32 rotates the shaft 34, the secondary shaft 40 rotates about its longitudinal axis, generating a vibration having a direction that is parallel to the shaft 34 and perpendicular to the skin of the animal. FIG. 5 illustrates the gearbox 38 of the vibrator 26 illustrated in FIG. 4. The gearbox 38 includes a primary gear 42 and a secondary gear 44. The primary gear 42 is secured to the shaft 34, and the secondary gear 44 is secured to the secondary shaft 40. The teeth of the primary gear 42 are operably engaged with the teeth of the secondary gear 44 such that when the primary gear 42 is rotated by the shaft 34, the secondary gear 44 rotates, rotating the secondary shaft 40. Those skilled in the art will recognize that the configuration of the gearbox 38 can be different from the illustrated configuration without departing from the scope or spirit of the present invention.

Figure 2:
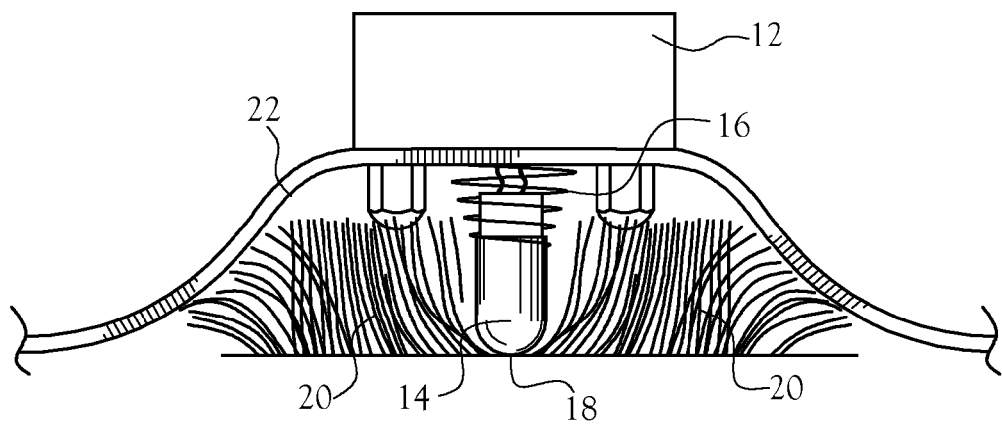
FIG. 2 illustrates one embodiment of the vibration probe in direct contact with the animal's skin.

Considering again FIG. 1, the vibration probe 14 is secured to the housing 12 using the coupler 16. The coupler 16 minimizes the inherent vibration dampening effect caused by the weight and mass of the housing 12 when the vibration probe 14 generates the vibration stimulus. More specifically, the coupler 16 secures the vibration probe 14 to the housing 12 such that the coupler 16 provides the vibration probe 14 a range a movement within which the vibration probe 14 can vibrate without being dampened by the weight and mass of the housing 12. Stated differently, the vibration probe 14 is flexibly coupled to the housing 12 such that the vibration probe 14 is capable of movement with respect to the housing 12. In the illustrated embodiment, the coupler 16 is a mechanical spring having a first end 46 and a second end 48. The first end 46 is secured to the housing 12, and the second end 48 is secured to the base member 28 of the vibration probe 14. The vibrator 26 of the vibration probe 14 is in electrical communication with a power source disposed within the housing 12 by way of an insulated wire or wires 50 such that the insulated wires 50 do not restrict or limit the movement of the vibration probe 14 provided by the coupler 16. When the vibration probe 14 generates the vibration stimulus, the vibration probe 14 vibrates substantially freely with respect to the housing 12. Consequently, when the vibration stimulus delivery device 10 is carried by the animal, it is able to deliver a vibration stimulus that is more robust and intense than that delivered by conventional vibration stimulus delivery devices. It should be noted that the coupler 16 can be a device other than a mechanical spring without departing from the scope or spirit of the present invention.

Figure 6:
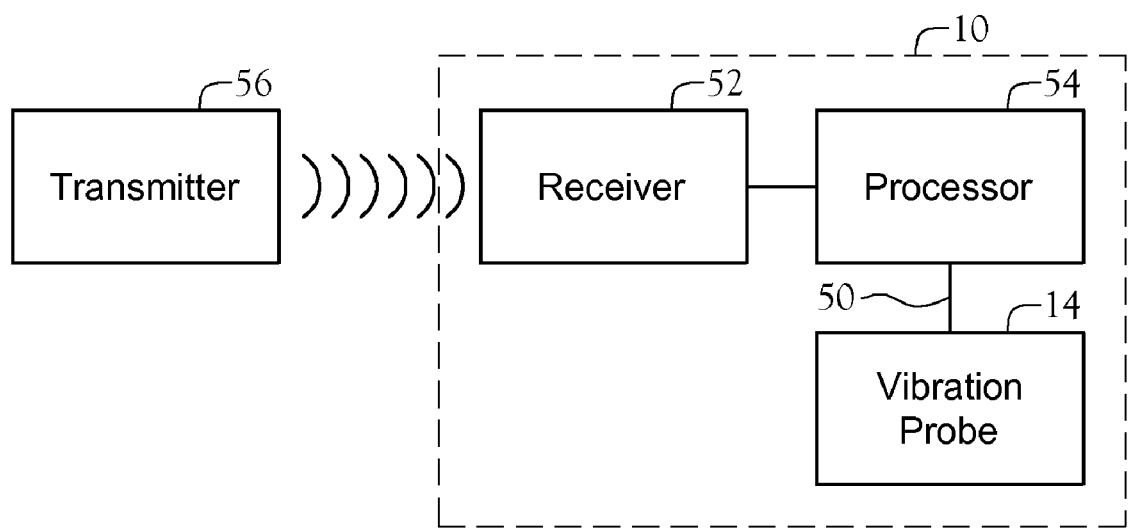
FIG. 6 is a block diagram of one embodiment of the vibration stimulus delivery device.

FIG. 6 is a block diagram of one embodiment of the vibration stimulus delivery device 10 in accordance with the various features of the present invention. In the illustrated embodiment, the vibration stimulus delivery device 10 includes a receiver 52, a processor 54, and the vibration probe 14, whereby the processor 54 is in electrical communication with the receiver 52 and the vibration probe 14 (by way of the insulated wires 50). The receiver 52 is in wireless communication with a transmitter 56. More specifically, the transmitter 56 transmits an activation signal that is received by the receiver 52. The transmitter 56 can be any device used to transmit a wireless signal. For example, the transmitter 56 can be a signal generator combined with a perimeter wire of an animal containment system or a handheld transmitter operated by an animal trainer. Additionally, the activation signal can be any wireless signal. For example, the activation signal can be a radio frequency signal or an audible signal, such as the bark of the animal. When the receiver 52 receives the activation signal, the processor 54 activates the vibration probe 14 such that the vibration probe 14 generates the vibration stimulus as discussed above. When the vibration probe 14 generates the vibration stimulus, it delivers the vibration stimulus to the animal in accordance with the above discussion.

From the foregoing description, those skilled in the art will recognize that a vibration stimulus delivery device for delivering a vibration stimulus to an animal offering advantages over the prior art has been provided. The vibration stimulus delivery device is carried by the animal and includes a housing and a vibration probe. The vibration probe is positioned in direct contact with the skin of the animal and generates a vibration, which, when delivered to the animal, is the vibration stimulus. The vibration probe is coupled to the housing such that the coupling minimizes the inherent vibration dampening effect caused by the weight and mass of the housing. The result is a vibration stimulus delivery device that delivers a more robust and intense vibration stimulus to the animal.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A vibration stimulus delivery device for delivering a vibration stimulus to an animal, said vibration stimulus delivery device comprising:
    a housing adapted to be carried by an animal encircling device;
    a processor disposed within said housing;
    a vibration probe having a vibration probe housing, a motor, and a moveable mass, said motor and said mass being disposed within the vibration probe housing, said motor moving said mass to produce a vibration, said motor being in electrical communication with said processor, said processor activates said motor such that said mass generates the vibration stimulus, the vibration probe housing vibrates when the said mass generates the vibration stimulus such that the vibration probe housing delivers the vibration stimulus to the animal; and
    a coupler flexibly coupling said vibration probe to said housing such that said coupler provides said vibration probe a range of movement within which said vibration probe is able to vibrate without being dampened by the weight and mass of said housing, said coupler positions said vibration probe housing in direct contact with the animal's skin.

2. The vibration stimulus delivery device of claim 1 wherein said coupler is a mechanical spring.

3. The vibration stimulus delivery device of claim 1 wherein the motor is in electrical communication with the processor by way of at least one flexible insulated wire.

4. The vibration stimulus delivery device of claim 1 further comprising a receiver in electrical communication with said processor, said receiver being adapted to receive an activation signal, said processor activating the motor when said receiver receives the activation signal.

5. The vibration stimulus delivery device of claim 4 wherein the activation signal is a wireless signal.

6. The vibration stimulus delivery device of claim 5 wherein the activation signal is a radio frequency signal.

7. The vibration stimulus delivery device of claim 4 wherein the activation signal is an audible signal.

8. The vibration stimulus delivery device of claim 7 wherein the activation signal is the bark of an animal.

9. The vibration stimulus delivery device of claim 1 wherein the moveable mass is an eccentric weight.

10. A vibration stimulus delivery device for delivering a vibration stimulus to an animal, said vibration stimulus delivery device comprising:
    a housing adapted to be carried by an animal encircling device, said housing housing a receiver and a processor, the receiver being in electrical communication with the processor, the receiver being adapted to receive an activation signal;
    a vibration probe having a vibration probe housing, a motor, and a moveable mass, said motor and said mass being disposed within the vibration probe housing, said motor moving said mass to produce a vibration, said motor being in electrical communication with the processor, the processor activates said motor when the receiver receives the activation signal, the mass generates the vibration stimulus when the motor is activated by the processor, the vibration probe housing vibrates when the motor and mass generates the vibration stimulus such that the vibration probe housing delivers the vibration stimulus to the animal; and
    a coupler securing said vibration probe to said housing, said coupler providing said vibration probe a range of movement within which the vibration probe is able to vibrate substantially freely with respect to said housing, said coupler positions the vibration probe housing in direct contact with the animal's skin such that vibration probe delivers the vibration stimulus to the animal.

11. The vibration stimulus delivery device of claim 10 wherein said coupler is a mechanical spring.

12. The vibration stimulus delivery device of claim 10 wherein the activation signal is a wireless signal.

13. The vibration stimulus delivery device of claim 10 wherein the activation signal is an audible signal.

14. The vibration stimulus delivery device of claim 10 wherein the moveable mass is an eccentric weight.

* * * * *